J. G. BRISTOL.
SHIELD.
APPLICATION FILED JUNE 30, 1917. RENEWED AUG. 20, 1919.
1,318,477.
Patented Oct. 14, 1919.
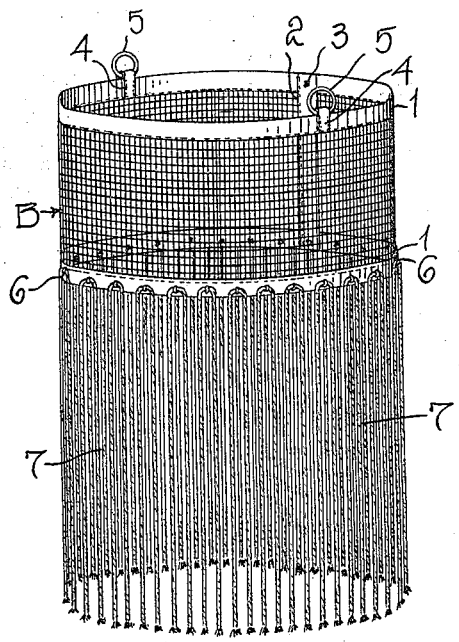
Inventor
JOSEPH G. BRISTOL
By Watson E. Coleman
Attorney

UNITED STATES PATENT OFFICE.

JOSEPH G. BRISTOL, OF FARGO, NORTH DAKOTA.

SHIELD.

1,318,477. Specification of Letters Patent. Patented Oct. 14, 1919.

Application filed June 30, 1917, Serial No. 177,935. Renewed August 20, 1919. Serial No. 318,785.

*To all whom it may concern:*

Be it known that I, JOSEPH G. BRISTOL, a citizen of the United States, residing at Fargo, in the county of Cass and State of North Dakota, have invented certain new and useful Improvements in Shields, of which the following is a specification, reference being had to the accompanying drawings.

This invention relates to certain improvements in shields and has relation more particularly to a device of this general character especially designed and adapted for use with equine animals; and it is an object of the invention to provide a novel and improved shield of this general character adapted to be applied to the head of an animal in such a manner as to protect the nose of an animal against insects.

It is also an object of the invention to provide a device of this general character of novel and improved construction whereby free ventilation is assured and whereby the lips and nostrils are effectively protected against insects and especially from underneath.

The invention consists in the details of construction and in the combination and arrangement of the several parts of my improved shield whereby certain important advantages are attained and the device is rendered similar, less expensive and otherwise more convenient and advantageous for use, all as will be hereinafter more fully set forth.

The novel features of the invention will hereinafter be definitely claimed.

In order that my invention may be the better understood, I will now proceed to describe the same with reference to the accompanying drawings, wherein is disclosed a view in perspective of a shield constructed in accordance with an embodiment of my invention.

As disclosed in the accompanying drawings, B denotes a cylindrical member open at its opposite ends and formed either of a foraminous or reticulated sheet, but as disclosed in the accompanying drawings, the same is produced of a wire mesh having its longitudinal margins protected by the binding strips 1 preferably of rubber and having its end margins, before assembled, also protected by a binding 2 preferably of leather, and said end portions are connected one to the other in any suitable manner, as indicated at 3, to produce the cylindrical body B.

The body B is adapted to be disposed around the nose and under jaw of an animal and is provided at its upper end with the diametrically opposed chapes or ears 4 preferably of leather and secured thereto in any desired manner. Operatively engaged with said chapes or ears 4 are the members 5 affording a means whereby the body may be conveniently secured to the holder or head stall, and as herein embodied, said members 5 comprise metal rings, although it is to be understood that any other members may be employed which will operate with convenience and facility.

The lower end of the body B is provided with an annular series of outstanding hooks 6. Secured substantially midway their lengths to the hooks 6 are the cords 7 affording danglers which, when the body B is in applied position, assume substantially a vertical position and thereby effectively protect the nostrils and the lips against insects and particularly from below or underneath. While I have shown the cords 7 as secured to the body B through the medium of the hooks 6, it will be understood that said cords may be secured thereto in any manner which best meets the requirements of practice.

By having the body B perforated and the opposite ends thereof open it will at once be self-evident that a free ventilation is assured and by having the body B cylindrical in form it will also be noted that the danglers are arranged in a circular position which results in an effective protection to the animal. It will also be self-evident that by having the opposite ends of the body B open, the open bottom obviates clogging of the shield by saliva, dust or from other causes.

From the foregoing description, it is thought to be obvious that a shield constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice, except as hereinafter claimed.

I claim:

A shield of the character described comprising a tubular body having its walls provided with open, ventilating perforations and its opposite ends open, and danglers secured to the lower end of the body at points extending entirely therearound.

In testimony whereof I hereunto affix my signature in the presence of two witnesses.

JOSEPH G. BRISTOL.

Witnesses:
 WM. MURPHY,
 AUBREY LAWRENCE.